S. SLAYTON.
SIGNALING DEVICE.
APPLICATION FILED OCT. 30, 1919.
1,370,229.
Patented Mar. 1, 1921.
2 SHEETS—SHEET 1.
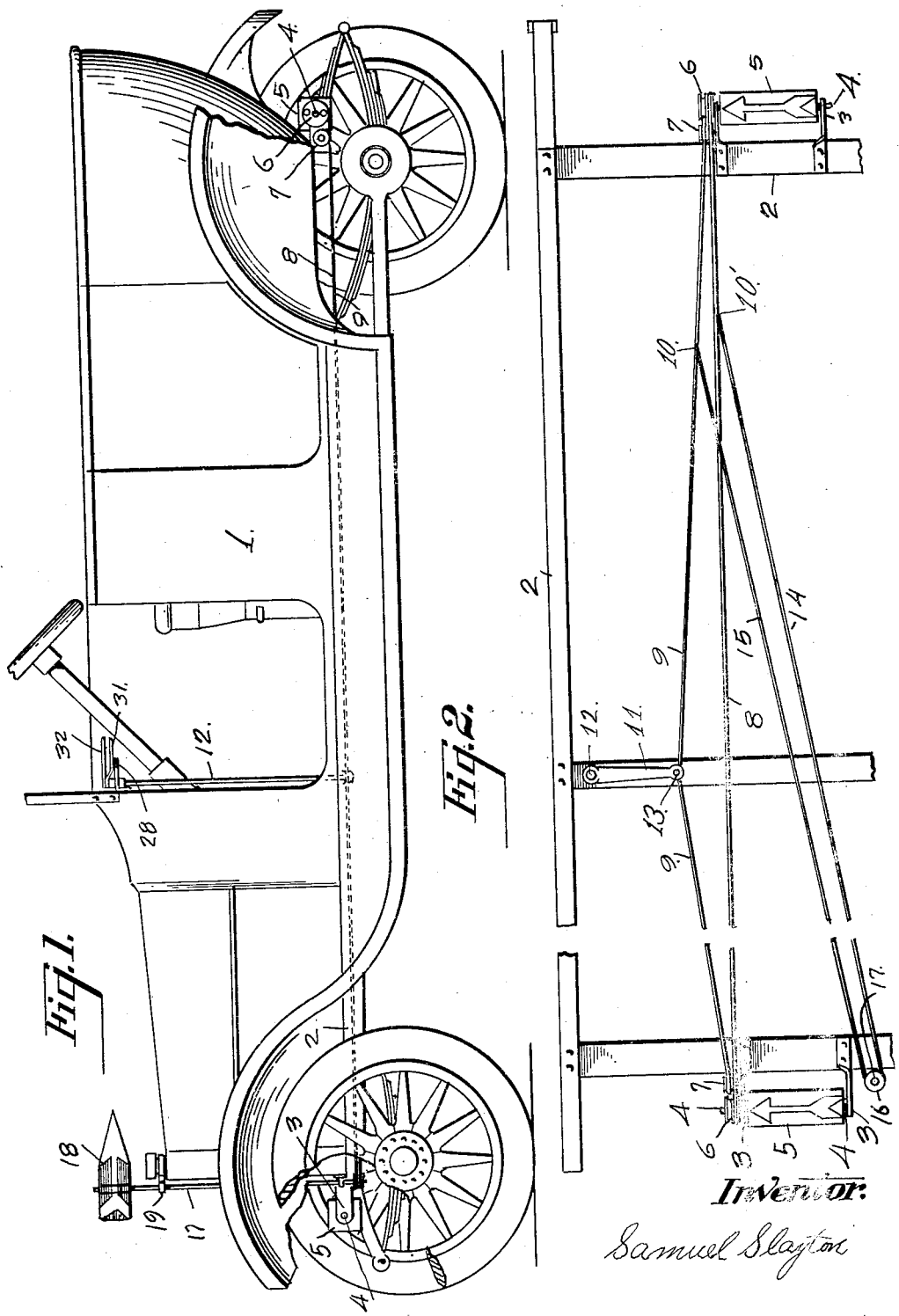
Inventor:
Samuel Slayton

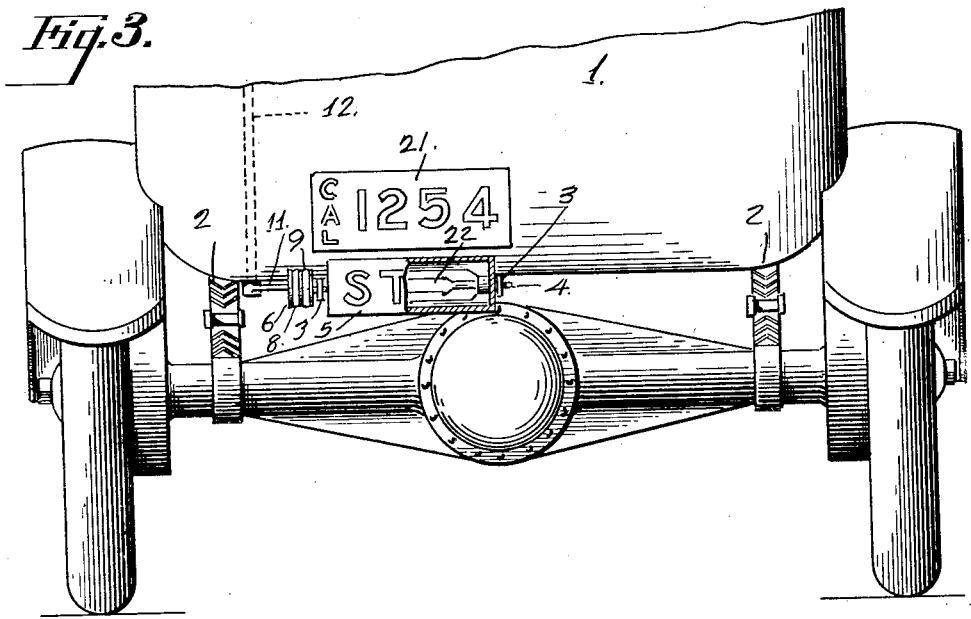
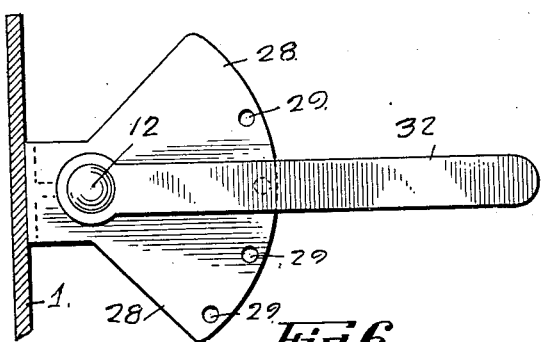
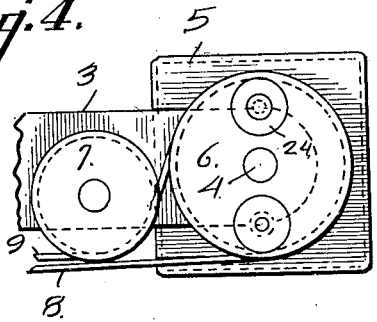
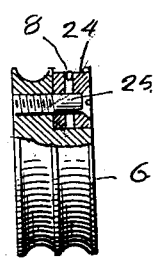
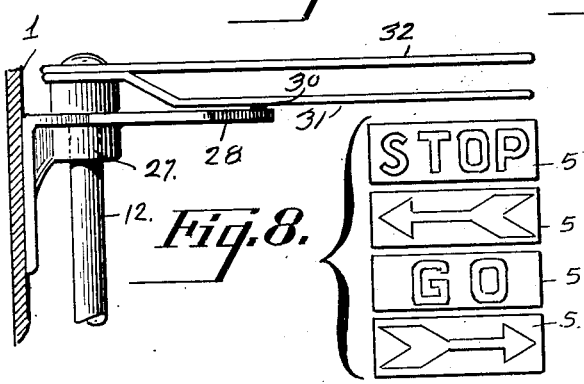

UNITED STATES PATENT OFFICE.

SAMUEL SLAYTON, OF SAN FRANCISCO, CALIFORNIA, ASSIGNOR, BY MESNE ASSIGNMENTS, TO J. D. GIVENS, OF SAN FRANCISCO, CALIFORNIA.

SIGNALING DEVICE.

1,370,229.   Specification of Letters Patent.   Patented Mar. 1, 1921.

Application filed October 30, 1919. Serial No. 334,502.

*To all whom it may concern:*

Be it known that I, SAMUEL SLAYTON, a citizen of the United States, residing in the city and county of San Francisco and State of California, have invented certain new and useful Improvements in Signaling Devices, of which the following is a specification.

The present invention relates to signaling devices for the guidance of those engaged in traffic and the vehicular use of the public highways.

Broadly, the object of the present invention is to provide a signaling device adapted for use either from fixed stations near congested crossings and operated by traffic officers, or as an accessory to motor or other vehicles and operated by the drivers. Subsidiary to the latter and as an adjunct thereto is the further provision of an illuminant, serving at night, the triple purpose of an illuminant for the signals, the license number, and as a tail-light.

It is obvious that, whether the device be applied to signaling at congested street-crossings, or applied as an accessory to motor or other vehicles for signaling therefrom, the principle remains unaltered, and that arrangement of parts other than as herein presented is possible without departing in any essential from the spirit of the invention.

In the accompanying drawings, forming a part of this specification, similar reference characters are used to designate like parts, throughout.

Figure 1 is a side elevation of an automobile equipped with my signaling device, showing a complete installation of the signal-bearing members, and the controller mechanism.

Fig. 2 is a plan view of the device, showing front and rear installations of signal-bearing members, and the transmission system through which they are operated.

Fig. 3 is a rear elevation of an automobile, showing a rear installation of the signal-bearing member, with inclosed illuminant, as arranged for signaling, the illumination of the license-plate, and for tail-light.

Fig. 4 is a detail of a sheave, and its accompanying idle-wheel, showing the arrangement therewith of a member of the transmission system.

Fig. 5 is a detail of the arc-shaped guide governing the movements of the controller mechanism.

Fig. 6 is a detail of the controller and its attached locking and releasing member.

Fig. 7 is a perspective view, sectioned, of a sheave, showing the adjusting and binding means whereby a member of the transmission is secured to it.

Fig. 8 is illustrative of the four signals as represented in the present construction.

The device, as shown, comprises a signal-bearing system, a transmission system, and an operating mechanism.

The signal-bearing system comprises front and rear, preferably hollow, members having a plurality of translucent faces 5 bearing thereon translucent signals, preferably in red, and an index-bearing member 18. The signal-bearing members 5 are supported by journals in bearings 4 carried by brackets 3 secured to the chassis 2. Sheaves 6 are borne by the journals 4, to which are adjustably attached, by means of clamping-plates 24 and set-screws 25, respective ends of the transmission system 8, 9, 14 and 15. The index-bearing member 18 is carried by a shaft 17 bearing a sheave 16 and rotatably secured by a bracket 19 attached to the front of the radiator carried by the body 1.

The transmission system comprises two bifurcate members 8, 14 and 9, 15, with bifurcations 10, 10', having their ends secured to their respective sheaves, 6, 6 and 16, as previously described, and shown in Fig. 7, and idle-wheels 7 provided for their accommodation.

The operating mechanism comprises a shaft 12 bearing a rocker-arm 11 secured by an eyelet and set-screw 13 to the member 9 of the transmission system, and rotatably supported by a bracket 27 carried by the body 1. The shaft 12 also carries a controller member 32 bearing a locking and releasing attachment 31, 30, for which there is provided a supporting and guiding member 28, forming a part of the bracket 27, having graduated openings 29 for the reception of the member 30 in locking against further movement.

In the provision for triple functioning of a signal-bearing member, as arranged for and shown in Fig. 3, the license-plate 21 receives light from the illuminant 22 through an upper face for its illumination, while, at the same time, the signal being displayed being in red and translucent serves also as a tail-light, thus removing, in night-service, the necessity of both a license and a tail light.

All parts being properly proportioned relative to the function required, and simple both as to design and construction, and of easy adjustment, positive synchronization of all movements and signal-displays is assured.

The device is of easy manipulation. With the controlling mechanism within convenient reach of the driver, any desired signal may be displayed by a simple hand-compression of the two members 31, 32, thereby releasing 30 from the opening 29, and permitting the shifting of the controller 32 to the particular opening indicating the desired change of signal, when a release of the member 31 permits 30 to enter the selected opening, thus again locking in position the controller 32. This act of shifting controller 32 rotates the shaft 12 sufficiently to cause the rocker-arm 11 to transmit through the transmission system 8, 9, 14, 15 the necessary movement for the rotation, through the agency of the sheaves 6, 6, 16, of the signal-bearing members 5, 5, 18, through a quadrant each, the only degree of movement required to bring a particular signal into position. The index-bearing member 18 being constantly under observation of the driver serves as a check and renders practically impossible the display of a wrong signal.

Having thus described my invention, I claim, and desire to secure by Letters Patent:

1. In an automobile signal, a shaft, an index bearing member borne by the shaft, turnable signal members at the rear and front respectively of the automobile, a pulley on the shaft, pulleys borne by said signal members, an endless cable connecting the signal member pulleys, and a cable engaged about the pulley of said shaft and connected at its ends to the respective sides of the endless cable of the signal member pulleys.

2. In an automobile signal, a pair of signals, an endless cable connecting said signals, a third signal, a pulley in connection with the third signal, a cable having an intermediate part passed around said pulley and having ends connected to the respective sides of the endless cable at points between the pair of signals, and means connected to one side of the endless cable to actuate the latter.

SAMUEL SLAYTON.